(12) United States Patent
Jackson et al.

(10) Patent No.: US 6,822,942 B1
(45) Date of Patent: *Nov. 23, 2004

(54) PROTOCOL EXTENSIONS FOR TELECOMMUNICATIONS NETWORK SYSTEMS AND METHOD

(75) Inventors: Michael A. Jackson, London (GB); Pamela Zave, Chatham, NJ (US)

(73) Assignee: AT&T Corp., New York, NY (US)

( * ) Notice: Subject to any disclaimer, the term of this patent is extended or adjusted under 35 U.S.C. 154(b) by 785 days.

This patent is subject to a terminal disclaimer.

(21) Appl. No.: 09/644,461

(22) Filed: Aug. 23, 2000

Related U.S. Application Data

(60) Provisional application No. 60/204,334, filed on May 15, 2000, provisional application No. 60/199,089, filed on Apr. 21, 2000, provisional application No. 60/166,563, filed on Nov. 19, 1999, and provisional application No. 60/154,877, filed on Sep. 20, 1999.

(51) Int. Cl.[7] .............................................. H04L 12/28
(52) U.S. Cl. .................. 370/254; 370/351; 379/221.15; 379/229
(58) Field of Search ................................ 370/351, 254; 379/221.15, 229

(56) References Cited

U.S. PATENT DOCUMENTS

| | | | | |
|---|---|---|---|---|
| 5,473,602 A | * | 12/1995 | McKenna et al. | 370/256 |
| 5,572,727 A | * | 11/1996 | Larsson et al. | 707/200 |
| 6,314,093 B1 | * | 11/2001 | Mann et al. | 370/351 |
| 6,404,878 B1 | * | 6/2002 | Jackson et al. | 379/221.01 |

* cited by examiner

*Primary Examiner*—Alpus H. Hsu
*Assistant Examiner*—Clemence Han

(57) ABSTRACT

A distributed features system is disclosed which permits a telecommunication network to accommodate the creation of open multimedia services. In accordance with an embodiment of the present invention, protocol extensions for a distributed feature system are disclosed which accommodate a broader range of media choices than conventional telephony. Protocols are disclosed for internal calls between modules in the distributed feature system that permit a module to open and close any number of media channels to be utilized in the communication usage. A protocol is also disclosed for internal calls between modules in the distributed feature system that is more appropriate for a packet-switched reference implementation.

9 Claims, 19 Drawing Sheets

```
proctype router(byte thisrouter)
{ byte from;
end_begin:      do
                :: to[thisrouter]?from,setup,0; to[box]!from,setup,0
                od
}
```

Figure 10

```
proctype box_with_2_callee_ports(byte thisbox,myport1,myport2)
{ byte farport;
end_begin:      do
                :: to[thisbox]?farport,setup,0;
                   if
                   :: (busy[myport1]==0); busy[myport1]=1;
                      to[myport1]!farport,setup,0
                   :: (busy[myport2]==0); busy[myport2]=1;
                      to[myport2]!farport,setup,0
                   :: to[farport]!myport1,upnack,0
                   fi
                od
}
```

Figure 11

```
proctype caller_port(byte thisport)
{ byte farport,tunnel;
end_idle:       to[router]!thisport,setup,0;
requesting:     if
                :: to[thisport]?farport,upack,0; goto linked
                :: to[thisport]?farport,upnack,0; goto end_idle
                fi;
linked:         do
                :: to[farport]!thisport,other,tunnel
                :: to[thisport]?eval(farport),other,tunnel
                :: to[farport]!thisport,teardown,0; goto unlinking
                :: to[thisport]?eval(farport),teardown,0;
                   to[farport]!thisport,downack,0; goto end_idle
                od;
unlinking:      do
                :: to[thisport]?eval(farport),other,tunnel
                :: to[thisport]?eval(farport),teardown,0;
                   to[farport]!thisport,downack,0
                :: to[thisport]?eval(farport),downack,0; goto end_idle
                od
}
```

Figure 12

```
proctype callee_port(byte thisport)
{ byte farport,tunnel;
end_idle:       to[thisport]?farport,setup,0;
responding:     if
                :: to[farport]!thisport,upack,0; goto linked
                :: to[farport]!thisport,upnack,0; goto end
                fi;
linked:         do
                :: to[farport]!thisport,other,tunnel
                :: to[thisport]?eval(farport),other,tunnel
                :: to[farport]!thisport,teardown,0; goto unlinking
                :: to[thisport]?eval(farport),teardown,0;
                   to[farport]!thisport,downack,0; goto end
                od;
unlinking:      do
                :: to[thisport]?eval(farport),other,tunnel
                :: to[thisport]?eval(farport),teardown,0;
                   to[farport]!thisport,downack,0
                :: to[thisport]?eval(farport),downack,0; goto end
                od;
end:            busy[thisport]=0; goto end_idle
}
```

Figure 13

```
proctype caller_port(byte thisport; chan in1,out1,in2,out2,...)
{ byte farport;
  mtype m;
end_idle:      to[router]!thisport,setup,0;
requesting:    if
               :: to[thisport]?farport,upack,0; in1!upack; in2!upack; ...;
                  goto linked
               :: to[thisport]?farport,upnack,0; goto end_idle
               fi;
linked:        do
               :: to[thisport]?eval(farport),status,0
               :: to[thisport]?eval(farport),m,1; in1!m
               :: to[thisport]?eval(farport),m,2; in2!m
               :: ...
               :: to[farport]!thisport,status,0
               :: out1?m; to[farport]!thisport,m,1
               :: out2?m; to[farport]!thisport,m,2
               :: ...
               :: to[farport]!thisport,teardown,0; goto unlinking
               :: to[thisport]?eval(farport),teardown,0;
                  to[farport]!thisport,downack,0;
                  in1!downack; in2!downack; ...; goto end_idle
               od;
unlinking:     do
               :: to[thisport]?eval(farport),status,0
               :: to[thisport]?eval(farport),m,1; in1!m
               :: to[thisport]?eval(farport),m,2; in2!m
               :: ...
               :: to[thisport]?eval(farport),teardown,0;
                  to[farport]!thisport,downack,0
               :: to[thisport]?eval(farport),downack,0;
                  in1!downack; in2!downack; ...; goto end_idle
               od
}
```

Figure 14

```
proctype callee_port(byte thisport; chan in1,out1,in2,out2,...)
{ byte farport;
  mtype m;
end_idle:       to[thisport]?farport,setup,0;
responding:     if
                :: to[farport]!thisport,upack,0; in1!upack; in2!upack; ...;
                   goto linked
                :: to[farport]!thisport,upnack,0; goto end
                fi;
linked:         do
                :: to[thisport]?eval(farport),status,0
                :: to[thisport]?eval(farport),m,1; in1!m
                :: to[thisport]?eval(farport),m,2; in2!m
                :: ...
                :: to[farport]!thisport,status,0
                :: out1?m; to[farport]!thisport,m,1
                :: out2?m; to[farport]!thisport,m,2
                :: ...
                :: to[farport]!thisport,teardown,0; goto unlinking
                :: to[thisport]?eval(farport),teardown,0;
                   to[farport]!thisport,downack,0;
                   in1!downack; in2!downack; ...; goto end
                od;
unlinking:      do
                :: to[thisport]?eval(farport),status,0
                :: to[thisport]?eval(farport),m,1; in1!m
                :: to[thisport]?eval(farport),m,2; in2!m
                :: ...
                :: to[thisport]?eval(farport),teardown,0;
                   to[farport]!thisport,downack,0
                :: to[thisport]?eval(farport),downack,0;
                   in1!downack; in2!downack; ...; goto end
                od;
end:            busy[thisport]=0; goto end_idle
}
```

Figure 15

```
proctype caller_port_channel(chan in,out)
{
end_call:       in?upack;
end_chan:       if
                :: out!open; goto opening
                :: in?open; goto being_opened
                :: in?downack; goto end_call
                fi;
opening:        do
                :: in?open
                :: in?oack; goto opened
                :: in?onack; goto end_chan
                :: in?downack; goto end_call
                od;
being_opened:   if
                :: out!oack; goto opened
                :: out!onack; goto end_chan
                :: in?downack; goto end_call
                fi;
opened:         do
                :: out!status
                :: in?status
                :: out!close; goto closing
                :: in?close; goto being_closed
                :: in?downack; goto end_call
                od;
closing:        do
                :: in?status
                :: in?close; goto closing2
                :: in?closeack; goto end_chan
                :: in?downack; goto end_call
                od;
closing2:       if
                :: out!closeack; goto closing3
                :: in?closeack; goto being_closed
                :: in?downack; goto end_call
                fi;
closing3:       if
                :: in?closeack; goto end_chan
                :: in?downack; goto end_call
                fi;
being_closed:   if
                :: out!closeack; goto end_chan
                :: in?downack; goto end_call
                fi
}
```

Figure 16

```
01  proctype transparent_box(byte p1,p2,b)
02  { byte farp1,farp2;
03  end_idle:       to[b]?farp1,setup,0; to[farp1]!p1,upack,0;
04                  to[router]!p2,setup,0;
05  requesting:     if
06                  :: to[p2]?farp2,upack,0; goto callsonly
07                  :: to[p2]?farp2,upnack,0; to[farp1]!p1,unavail,0;
08                     to[farp1]!p1,teardown,0; goto cleaningp1
09                  fi;
10  callsonly:      do
11                  :: to[p1]?eval(farp1),open,5; to[farp2]!p2,open,5;
12                     goto p1opening
13                  :: to[p2]?eval(farp2),open,5; to[farp1]!p1,open,5;
14                     goto p2opening
15                  :: to[p1]?eval(farp1),status,0; to[farp2]!p2,status,0
16                  :: to[p2]?eval(farp2),status,0; to[farp1]!p1,status,0
17                  :: to[p1]?eval(farp1),teardown,0;
to[farp1]!p1,downack,0;
18                     to[farp2]!p2,teardown,0; goto cleaningp2
19                  :: to[p2]?eval(farp2),teardown,0;
20                     to[farp2]!p2,downack,0;
21                     to[farp1]!p1,teardown,0; goto cleaningp1
22                  od;
23  p1opening:      do
24                  :: to[p2]?eval(farp2),oack,5; to[farp1]!p1,oack,5;
25                     goto opened;
26                  :: to[p2]?eval(farp2),onack,5; to[farp1]!p1,onack,5;
27                     goto callsonly;
28                  :: to[p2]?eval(farp2),open,5
29                     . . .
30                  od;
31  p2opening:      do
32                  :: to[p1]?eval(farp1),oack,5; to[farp2]!p2,oack,5;
33                     goto opened;
34                  :: to[p1]?eval(farp1),onack,5; to[farp2]!p2,onack,5;
35                     goto callsonly;
36                  :: to[p1]?eval(farp1),open,5; goto glare_treatment
38                     . . .
39                  od;
```

Figure 17A

```
40  opened:        do
41                 :: to[p1]?eval(farp1),status,5; to[farp2]!p2,status,5
42                 :: to[p2]?eval(farp2),status,5; to[farp1]!p1,status,5
43                 :: to[p1]?eval(farp1),close,5; to[farp1]!p1,closeack,5;
44                    to[farp2]!p2,close,5; goto closingp2
45                 :: to[p2]?eval(farp2),close,5; to[farp2]!p2,closeack,5;
46                    to[farp1]!p1,close,5; goto closingp1
47                 . . .
48                 od;
49  closingp1:     do
50                 :: to[p1]?eval(farp1),status,5
51                 :: to[p1]?eval(farp1),close,5; to[farp1]!p1,closeack,5
52                 :: to[p1]?eval(farp1),closeack,5; goto callsonly
53                 . . .
54                 od;
55  closingp2:     do
56                 :: to[p2]?eval(farp2),status,5
57                 :: to[p2]?eval(farp2),close,5; to[farp2]!p2,closeack,5
58                 :: to[p2]?eval(farp2),closeack,5; goto callsonly
59                 . . .
60                 od;
61  cleaningp1:    do
62                 :: to[p1]?eval(farp1),status,0
63                 :: to[p1]?eval(farp1),open,5
64                 :: to[p1]?eval(farp1),oack,5
65                 :: to[p1]?eval(farp1),onack,5
66                 :: to[p1]?eval(farp1),status,5
67                 :: to[p1]?eval(farp1),close,5
68                 :: to[p1]?eval(farp1),closeack,5
69                 :: to[p1]?eval(farp1),teardown,0; to[farp1]!p1,downack,0
70                 :: to[p1]?eval(farp1),downack,0; goto end_idle
71                 od;
72  cleaningp2:    do
73                 :: to[p2]?eval(farp2),status,0
74                 :: to[p2]?eval(farp2),open,5
75                 :: to[p2]?eval(farp2),oack,5
76                 :: to[p2]?eval(farp2),onack,5
77                 :: to[p2]?eval(farp2),status,5
78                 :: to[p2]?eval(farp2),close,5
79                 :: to[p2]?eval(farp2),closeack,5
80                 :: to[p2]?eval(farp2),teardown,0; to[farp2]!p2,downack,0
81                 :: to[p2]?eval(farp2),downack,0; goto end_idle
82                 od;
83  }
```

Figure 17B

|  | type | IO | T | R | M | OSF |
|---|---|---|---|---|---|---|
| call protocol signals | setup | X | X | X |  | ? |
|  | upack | X | X |  |  | ? |
|  | upnack | X | X |  |  | ? |
|  | teardown | X | X |  |  | ? |
|  | downack | X | X |  |  | ? |
| channel protocol signals | open | X | X |  | X | ? |
|  | oack | X | X |  |  | ? |
|  | onack | X | X |  |  | ? |
|  | close | X | X |  |  | ? |
|  | closeack | X | X |  |  | ? |

Figure 20

|  | type | IO | T | EO | CH | ST | OSF |
|---|---|---|---|---|---|---|---|
| response status signals | unknown | X | X | X |  |  | ? |
|  | avail | X | X | X |  |  | ? |
|  | unavail | X | X | X |  |  | ? |
|  | ready | X | X | X |  |  | ? |
|  | wait | X | X | X |  |  | ? |
|  | accept | X | X | X |  |  | ? |
|  | reject | X | X | X |  |  | ? |
| interface st. signals | symbol | X | X | X | X |  | ? |
|  | other | X | X | ? |  |  | ? |
| feature st. signals | other | X | X |  |  |  | ? |
| media st. signals | text | X | X |  |  | X | ? |
|  | other | X | X |  |  |  | ? |

Figure 21

PROTOCOL EXTENSIONS FOR TELECOMMUNICATIONS NETWORK SYSTEMS AND METHOD

CROSS REFERENCE TO RELATED APPLICATIONS

This application claims priority to Provisional Application "Routing Extensions For Telecommunications Network System and Method," Ser. No. 60/154,877, filed on Sep. 20, 1999; "DFC: Signaling and Media Extensions," Ser. No. 60/166,563, filed on Nov. 19, 1999; "Eclipse: Software Architecture for Next Generation Telecommunications," Ser. No. 60/199,089, filed on Apr. 21, 2000; "New Feature Interactions in Mobile and Multimedia Telecommunication Services," Ser. No. 60/204,334, filed on May 15, 2000, the contents of which are incorporated by reference herein.

This application is related to Utility Application, "Telecommunication Network System and Method," Ser. No. 09/034,681, filed on Mar. 4, 1998, by the same inventors, which is incorporated by reference herein.

1. Field of the Invention

The invention relates to telecommunications networks, and more particularly to advanced architectures for the description of telecommunication services.

2. Background of the Invention

The feature-interaction problem arises from the incremental, feature-by-feature, extension of telecommunications system functionality. As new features such as call forwarding, call waiting, or three-way calling have been added to telecommunication systems, it has become increasingly difficult to manage the behavioral complexity of the features and their interactions. Redesign of old features to fit smoothly with the new features is scarcely ever a practical option. Eventually, the resulting complexity damages the quality and productivity of all phases of telecommunication software development.

In the pending utility application, "Telecommunication System and Method," Ser. No. 09/034,681, filed on Mar. 4, 1998, which is incorporated by reference herein, the inventors introduced an architecture for managing the feature-interaction problem. The inventors presented a virtual architecture for telecommunication systems, which they called distributed feature composition (referred to herein as "original DFC"), in which a feature corresponds to a component type; each telephone call is handled by building a configuration of instances of these components, according to the features to be applied to that particular call. The feature component instances communicate by featureless internal calls that are connected by the underlying architectural substrate. A new feature is specified by describing its corresponding component type (or occasionally, two component types) and the rules for including the component instances into configurations.

DFC was designed in the context of a conventional telephony call for feature modularity, structured feature composition, analysis of feature interaction, and separation of service and transmission layers. Conventional telephony, however, deals only with a single medium (i.e. voice), a single network architecture (the PSTN), and very nearly a single device (the POTS telephone). Modern networks and devices pose new challenges: what was once a hard problem has become even harder, with the rapid proliferation of different types of devices, different network architectures (e.g., the Internet, Cable, Wireless, etc.), and multi-media (voice, text, video, etc.). Devices are evolving and proliferating more quickly than service software can be adapted. Service logic issues are often intertwined with transmission issues, which works against portability. Network providers have adopted a variety of service architectures and APIs, preventing interoperation even when interoperation is their goal. Incremental features have an unclear impact on previously developed features, making it difficult for knowledgeable and trusted programmers to implement enhancements (to say nothing of third party contributions, which are typically out of the question altogether).

Accordingly, it is an object of the present invention to remedy the above and other problems by enhancing and modifying DFC to accommodate open telecommunication systems, mobile telecommunication users, multimedia telecommunication services, unified messaging, and other aspects of modern telecommunication systems and services.

SUMMARY OF THE INVENTION

A distributed features system is disclosed which permits a telecommunication network to accommodate the creation of open multimedia services. In accordance with an embodiment of the present invention, protocol extensions for a distributed feature system are disclosed which accommodate a broader range of media choices than conventional telephony. Protocols are disclosed for internal calls between modules in the distributed feature system that permit a module to open and close any number of media channels to be utilized in the communication usage. A protocol is also disclosed for internal calls between modules in the distributed feature system that is more appropriate for a packet-switched reference implementation.

It is an object of the present invention to create an architecture that facilitates modularity and compositional service creation.

It is another object of the present invention to support multimedia services, e.g. services that can include voice, graphics, video and text components.

It is another object of the present invention to provide an architecture that is general, flexible, permits third party feature development, and can interact with other networks.

These and other aspects and advantages of the invention will be apparent to those of ordinary skill in the art by reference to the following detailed description and the accompanying drawings.

BRIEF DESCRIPTION OF THE DRAWINGS

FIG. 10 is a sample program listing written in Promela illustrating the behavior of a router.

FIG. 11 is a sample program listing written in Promela illustrating the behavior of a box with two callee ports.

FIG. 12 is a sample program listing written in Promela illustrating an embodiment of the call protocol and the behavior of a DFC port that places a call.

FIG. 13 is a sample program listing written in Promela illustrating an embodiment of the call protocol and the behavior of a DFC port that receives a call.

FIGS. 14, 15, and 16 are sample program listings written in Promela illustrating an augmented call protocol and channel protocol to handle different media channels.

FIGS. 17A and 17B are a sample program listing written in Promela illustrating the behavior of a free, two-port transparent box.

FIG. 20 is a table summarizing a list of protocol signals suitable for use with a preferred embodiment of the present invention.

FIG. 21 is a table summarizing a list of status signals suitable for use with a lo preferred embodiment of the present invention.

DETAILED DESCRIPTION

Figure 1:
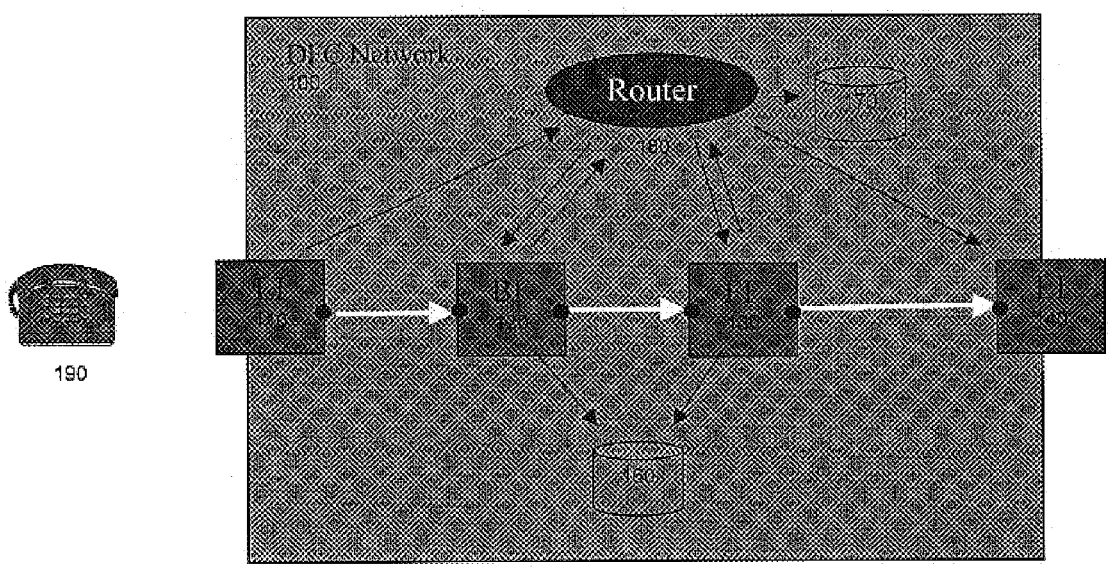
FIG. 1 is an abstract diagram of a distributed feature system.

FIG. 1 sets forth an example of an abstract diagram of a distributed feature system, namely an instantiation of Distributed Feature Composition ("DFC"), suitable for use with a preferred embodiment of the present invention. DFC is further described in co-pending utility applications, "Telecommunication Network System and Method," Ser. No. 09/034,681, filed on Mar. 4, 1998, and "Routing Extensions for Telecommunication Network System and Method," filed contemporaneously with the present application, both of which are incorporated by reference herein. Although the present invention is described in the context of DFC, the principles of the present invention can be readily extended by one of ordinary skill in the art to other distributed feature architectures.

As depicted in FIG. 1, the virtual DFC network 100 comprises one or more routers 180 and a plurality of primitive modules (alternatively referred to as components or boxes), e.g. 110 through 140 in FIG. 1. The modules have well-defined interfaces including ports for inter-module communication, depicted in FIG. 1 as black dots. When a customer wishes to initiate a customer call at a communication device 190, the device sends a signal to a line interface module 110 associated with the device. The line interface module 110 demarcates the edge of the DFC logical network and serves to translate between the native protocols of the system, described in further detail below, and that of the particular hardware or software endpoint. The line interface module 110 sends a setup request to the router 180 which constructs a routing list of feature modules based on routing data 170, e.g. such as a feature box registry and subscriber data useful for routing decisions. The router 180 transmits the setup message and the routing list to the first feature module on the routing list, e.g. 120 in FIG. 1. The line interface and the feature module 120, using the call protocol described in the above-pending application and below, then establishes what is referred to as an "internal call" between a caller port on the first module 110 and a callee port on the second module 120. Upon successful completion of this internal call between 110 and 120, the feature module 120 then issues another setup request to the router 180 appending the routing list which is forwarded by the router 180 to the next feature module 130 on the list. Again, another internal call is established between the modules 120 and 130 using the call protocol. Finally, a communication usage in the distributed feature system is completed when a connected graph of internal calls is completed between interface module 110 and another interface module 140 (which may be associated with another communication device, i.e. another line interface module, or with a communication trunk, referred to as a trunk interface module).

The assembly of the different feature modules in the communication usage serve to implement the features/services that apply to the particular usage. Signaling propagates through the chain of feature boxes, which implement behaviors based on the sequence of events which take place as well as other considerations. Feature modularity can be guaranteed in DFC by the rules governing feature modules. It is advantageous to make the interfaces well-defined such that any two modules are guaranteed to be composable. It is advantageous for modules to be unable to discern the type of the feature module they are communicating with; that knowledge would allow them to behave specially depending on neighboring behavior, which would violate feature modularity. It is also advantageous to impose strict rules governing the sharing of data between feature modules of different types or between feature modules serving different subscribers. Such rules permit feature module developers to develop modular feature boxes, e.g., feature boxes that implement a particular behavior without regard to the presence or absence of other features in the system.

In original DFC, which was specifically designed for telephone services, an internal call was described as having two channels: a two-way signaling channel and a two-way voice channel. For multimedia telecommunications, a call must be able to have, in addition to a signaling channel, any number of media channels. A medium is defined as a distinct and global form of communication, as seen from the user's perspective. Although the most commonly discussed media for telecommunications are voice, video, text, images, and high-fidelity sound, a DFC system is not limited to these; nor need it offer all of them. Whether a media channel is one-way or two-way will depend on the characteristics of its medium. It is also possible for a call to have no media channels at all.

Protocols for signaling along the signaling channel of a DFC call are described below that take into account the multiple media channels that may be part of a communication usage. It should be noted that the media channels of a DFC call can be implemented in any manner whatsoever, using any protocols and representations, provided that their implementation does not conflict with the requirements described below. In accordance with a preferred embodiment of the present invention, media channels of each call are identified by natural numbers. Each signal carries what is referred to herein as a tunnel field where tunnel values are non-negative integers. Signals referring specifically to media channel n have n in their tunnel fields. Signals referring to the call as a whole have zero in their tunnel fields. The term "tunnel" refers to the fact that signals related to each media channel can be separated from all others, as if they traveled through the signaling channel in their own private tunnel.

1. The Call Protocol

The call protocol, as alluded to above, is used to setup and tear down internal calls in the distributed feature system. The call protocol described in co-pending utility patent application Ser. No. 09/034,681, filed on Mar. 4, 1998, by the same inventors, is written for a reference implementation with a single central switch. Each box and port has a dedicated queue for sending signals to the switch, and a dedicated queue for receiving signals from it. When a signal travels from port p1 to port p2, it does so because the switch receives the signal on its queue from p1 and then sends the signal on its queue to p2, because of a prearranged relationship between p1 and p2. Thus that call protocol written for this reference implementation is easily adapted to circuit-switched networks. The call protocol as presented in the above application can still be utilized with a multimedia distributed feature system with the following changes: (1) The signal type quickbusy is renamed to upnack; and (2) as described above, each signal carries an additional tunnel field. All of the signals of the example call protocol would have zero in this field.

In accordance with an embodiment of the present invention, the following call protocol may also be utilized. This version of the call protocol is written for a reference implementation based on packet-switched networks. With both versions available, every implementor should have a reference implementation of the call protocol that looks familiar. The protocols below are illustrated using the Promela modeling language, which is known in the art. See, e.g, G. J. Holzmann, "Design and Validation of Protocols: A Tutorial", Computer Networks and ISDN Systems XXV: 981–1017, 1993. Since the choice of a particular language inevitably imposes expressive bias, it is crucial to keep the following in mind: The only DFC phenomenon described by these protocols is signaling, and the only DFC behavior described by these protocols is the behavior of boxes and routers in exchanging signals with other boxes and routers. This means that the process decomposition, process arguments, and means of communication among processes representing the same box are all arbitrary with respect to the present invention.

The vocabulary of signals in the new version of the call protocol is:

```
mtype = { setup,upack,upnack,
          other,
          teardown, downack }
```

As mentioned above, the signal type quickbusy has been renamed to upnack. The signal type other is a temporary representative of all other signals that can be sent as part of a call. Its meaning will be elaborated in subsequent sections.

There is a queue, containing incoming signals, for every location that can receive signals. These locations are either DFC ports on DFC boxes, DFC boxes themselves, or DFC routers. The queues are arranged in an array to, with indices of type byte ranging from zero to locsize−1.

chan to[locsize]=[chansize] of {byte,mtype,byte} Queue indices are henceforth referred to as addresses. Note, however, that these are addresses internal to a DFC system or its implementation. They are fundamentally different from the "addresses" of co-pending utility patent application, "Routing Extensions for Telecommunication Network System and Method", which identify customers, devices, or other objects outside a DFC system.

In the programs set forth in FIGS. 10–13, each signal has three fields. The first holds the address of the DFC port from which it was originally sent, the second holds the signal type, while the third holds the tunnel.

Routers. A DFC router receives setup signals from calling ports and forward them to appropriate DFC boxes. FIG. 10 sets forth a program for a router where box represents the router's current choice of box. A DFC system can have any number of routers. In subsequent programs, router represents the address of any router.

Box. Another participant in the call protocol is the box to which a setup signal is sent by a router. The sample program shown in FIG. 11 is for a box with two callee ports. The box knows (through arguments) its own address and those of its two callee ports. When a setup signal is received, the box can forward it to any idle callee port, or it can reject the setup even if it has an idle callee port. Typically a box with an idle callee port rejects a call because the idle port is reserved for calls playing a role that the rejected call is not qualified to play. The array busy has a Boolean value for every callee port, initialized by Promela to zero (which encodes the Boolean value false). In these programs busy is shared global data, although it is only used for communication between a box process and its port processes. In fact its purpose is intra-box synchronization, which can be implemented in many other ways.

Caller Port. FIG. 12 presents a program for a DFC port that places a call. The argument thisport supplies the port's own address. The caller port first sends its setup signal to a router, which has the only address (besides its own) that it knows. Eventually a response comes back, and its address of origin is bound to the local variable farport. For the rest of the call, if any, signals are simply sent between the addresses farport and thisport. The difference between the use of the variable farport in the two statements:

```
to [thisport] ?farport,upack, 0;
to [thisport] ?eval (farport) , other, tunnel
``` is that the first receive action binds farport to the value in the first field of the signal received, while the second receive is only executable if the first field of the signal received matches the current value of farport.

Callee Port. FIG. 13 presents a program for a DFC port that receives a call. The argument thisport again supplies the port's own address. The local variable farport is used the same way in this program as in the caller-port program. Note the last statement, which sets the port's externally observable status back to idle.

Fundamentally the above call protocol is a port-to-port protocol. Almost all signals originate at DFC ports and are absorbed (possibly after some forwarding) by DFC ports. The only exceptions are a setup signal absorbed by a box process, and a subsequent upnack signal generated by the box process. As observed outside the box, however, the signals might just as well have been received/sent by myporti. Since the protocol properties are properties of ports, the role played by boxes and routers is more casual. Specifically, the programs in FIGS. 10 and 11 should be understood as partial descriptions of boxes and routers; they are free to receive and send other signals, provided that other functions do not interfere with the timely execution of the programs given here. On the other hand, it is advantageous to limit the possible behavior of DFC ports to that described by the programs in FIGS. 12 and 13 (and 11, regarding the <setup, upnack> sequence there as behavior of port myport1).

It is important to show that the protocol cannot deadlock. To do this, we must place one additional constraint on the unspecified and partially specified processes of the system: that none of them send signals directly to DFC ports (except as already specified here). With this constraint in force, freedom from deadlock has been verified by use of the Spin model checker. See, e.g. http://netlib.bell-labs.com/netlib/spin/whatisspin.html. Note that with this constraint in force, the pattern matching imposed by the use of eval (farport) is unnecessary. It is also important to note that freedom from deadlock only applies to the protocol as written. Real box programs can impose additional constraints on other signals, and these can still introduce deadlocks.

The other important property of the protocol is that it provides reliable signaling between the ports of a call. In other words, the sequence of other signals received by the callee port during a call is exactly the sequence sent by the caller port during the call. Also, the sequence of other signals received by the caller port during a call is exactly the sequence sent by the callee port during the call. This property has also been verified by use of the Spin model checker. It is important to note, however, that call signaling in an implementation will only be reliable if the queues (Promela channels) are implemented by reliable transmission.

It is advantageous that no additional signal types be added to the call protocol. Only the set of status signals should be extensible, as discussed below in Section 3. However, it is permissible to add additional fields to existing signal types of the call protocol. Typically such a field carries information that would normally be carried by a new type of status signal, but cannot be carried by a true status signal because any such signal would arrive too late in the call. For example, consider a source-zone feature box that enables its subscriber to deposit voice mail in a person's mailbox without incurring the risk of talking to the person. Of course, this can (and should) only succeed with the cooperation of the person's target-zone voice-mail features. The source-zone feature box must put a notification in an extra field of the setup signal which the target-zone feature box responds to by invoking voice mail immediately, without attempting to reach the target's line interface. Any signal after the setup signal would be too late for such a notification, as the target-zone feature box might have already sent an outgoing setup signal.

Figure 2A:
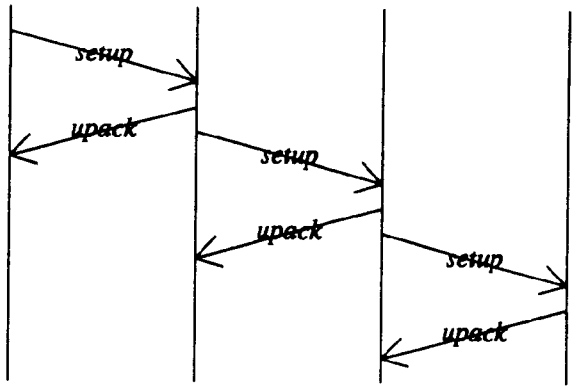
FIGS. 2A and 2B are message-sequence charts illustrating two ways of setting up a chain of calls.
Figure 2B:
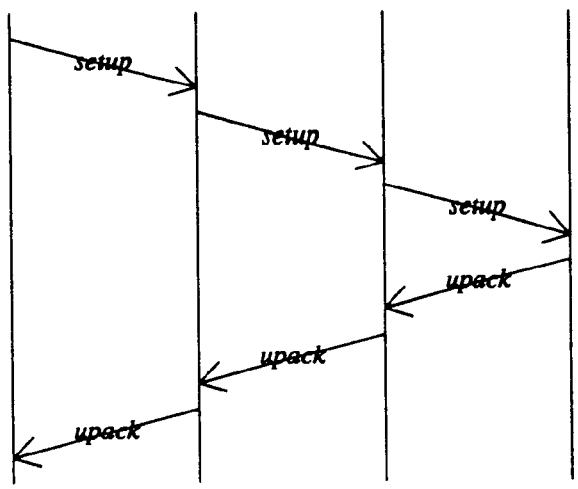

FIGS. 2A and 2B shows two message sequence charts, in which horizontal distance represents space and vertical distance represents time. Each vertical line represents the action sequence of a two-port feature box. In FIG. 2A a chain of calls is being set up piecewise, by which we mean that the setup phase of each call is completed before the next call is attempted. In FIG. 2B a chain of calls is being set up end-to-end, by which we mean that no setup phase is completed until the setup phase of the next call in the chain has already been completed. It is advantageous for DFC feature boxes to set up related calls in a piecewise fashion. If boxes set up calls in an end-to-end fashion, a box is completely prevented from doing any functional signaling— signaling in pursuit of the goals of its feature—until the call chain has reached its endpoint. This will make some features difficult or impossible to program. For example, a "target unavailable" treatment must be able to act independently when a specific time interval has passed since it received a setup signal, regardless of whether it has received any replies from downstream. It is also advantageous for DFC feature boxes to tear down related calls in a piecewise fashion. This means that a box receiving a teardown signal acknowledges it before propagating it down the call chain. With this convention, ports are freed for re-use as soon as possible. Some additional consequences of piecewise tear-down are discussed below in Section 5.

2. The Channel Protocol

In the original version of DFC, described in co-pending utility application Ser. No. 09/034,681, filed on Mar. 4, 1998, each call has one voice channel and no other media channels. In accordance with an embodiment of the present invention, a call can have any number of channels of any medium. This makes it necessary to add a protocol to open and close media channels explicitly, because without it there would be no way to tell which media channels a call is using.

The channel protocol has similarities to the call protocol. To avoid confusion, we give similar signals different names in the two protocols, as shown in the table below. The hyphens are not usually used in spelling the signal names; they are present in the table only as a guide to pronunciation.

| corresponding signals of the | |
|---|---|
| call protocol | channel protocol |
| set-up | o-pen |
| up-ack | o-ack |
| up-nack | o-nack |
| tear-down | close |
| down-ack | close-ack |

Each signal of type open carries a field medium. The value of this field indicates the medium of the channel being requested.

The new vocabulary of signals is:

```
mtype = { setup, upack, upnack,
          open, oack, onack,
          status,
          close, closeack,
          teardown, downack }
```

The signals formerly known as having type other are now seen to be either signals of the channel protocol or status signals. As explained above, the signals related to each media channel of a call travel through their own tunnel of the signaling channel. Status signals (to be discussed further in Section 3) can either refer to a media channel or to the call as a whole.

To preserve the familiar structure of the call protocol, and the analogous structure of the channel protocol, we express them as distinct Promela processes. These processes communicate through shared (paired) events, expressed in Promela as reads and writes to queues of zero capacity. Since communication between the processes is synchronous, the process decomposition does not affect the ordering of events at each end of a call in any way.

The Augmented Call Protocol. Of the programs explained in Section 1, only the caller-port and callee-port programs need to change. The caller-port program, set forth in FIG. 14, has two additional arguments for each possible media channel; they are the queues (declared elsewhere as having zero capacity) through which a caller-port process communicates with the process performing the channel protocol for that channel. In the requesting state, if a caller-port process receives an upack signal through the call protocol, it also sends an upack signal to each of its channel processes. This informs them that a call now exists. Note that the signals in these local queues are of type mtype; they have no need for origin addresses or tunnels. In its linked state, the caller-port process can receive signals in media tunnels. Such a signal is forwarded immediately, through a shared event such as in1!m, to the process performing the channel protocol for the appropriate media channel. In its linked state the process can also receive signals from a channel process, intended to be sent out on the signaling channel of the call. They are received through shared events such as out1?m. Such a signal is sent out immediately on the signaling channel of the call, with the appropriate tunnel field. When a call is completely finished, a caller-port process sends a downack signal to each of its channel processes. This informs them that a call no longer exists. The callee_port process is augmented in similar ways, as set forth in FIG. 15.

The Channel Protocol. Within a call, a media channel can be opened and closed any number of times, and opening can be initiated by either port of the call. This can be seen clearly in the cyclic structure of the process illustrated in FIG. 16. This process can do nothing until it receives an upack signal indicating that a call has been set up at the port. It can also do nothing after it receives a downack signal, at least until the next upack signal. This means that call teardown automatically closes all open media channels. The fact that there are more closing states in the channel protocol than unlinking states in the call protocol does not mean that they are fundamentally different. It is simply because the "master" call protocol can have longer uninterruptable sequences of events than the "slave" channel protocol can. To see why, imagine that the channel protocol is written in the same way as the call protocol. Then there is a possible execution state in which the caller port process is in its unlinking state and has just received a downack signal. It must next perform the send action in1! downack, which is synchronized with the receive action in?downack in a caller channel process. At the same time, the caller channel process could be in its opened state, and have just executed the guard of the guarded command ::in?close; out!closeack; goto end$_{13}$ chan In this state the caller channel process must next perform the send action out!closeack, which is synchronized with the receive action out1?closeack in the caller port process. Clearly the two processes are deadlocked. In the actual programs presented here, we solve the problem by giving precedence to the port process. There is a "glare" condition if both ports of a call attempt to open a media channel at approximately the same time. A glare condition is always resolved in favor of the caller port. Thus the callee_port_ channel process differs from the caller_port_channel process only in its opening state, which has the following program:

```
opening:       if
               : : in?open; goto being_opened
               : : in?oack; goto opened
               : : in?onack; goto end_chan
               : : in?downack; goto end_call
               fi ;
```

If, having sent an open, this process immediately receives an open instead of the expected oack or onack, it knows that there is glare. As the perennial loser, this process immediately gives up on its attempt to open the channel.

Under assumptions similar to those described in Section 1, the augmented protocol cannot deadlock. Also, each tunnel is reliable with respect to status signals: During each episode in which a media channel is open, the sequence of signals sent through its tunnel from the caller port is exactly the sequence of signals received through its tunnel at the callee port, and the sequence of signals sent through its tunnel from the callee port is exactly the sequence of signals received through its tunnel at the caller port. It is advantageous that no additional signal types be added to the channel protocol. As with call signals, additional fields can be added to channel signals if they are needed for special purposes, and if corresponding status signals might not be timely.

Unlike a chain of related calls, as described above in Section 1, it is advantageous that a chain of related channels be opened end-to-end. The signaling issues that discourage end-to-end setup of call chains do not apply to channels. In their absence, it is more informative to the feature boxes and more efficient in the implementation to reflect the reality that useful media connections are always end-to-end. Put another way, media streams can only be interpreted by endpoints. If a feature box needs to do in-band signaling such as playing an announcement to the caller, then it will participate in opening a chain of media channels between the caller's line interface and an announcement server. All feature boxes, in contrast, can interpret signals, and are therefore legitimate endpoints for signaling channels.

Like a chain of related calls, a chain of related channels should be closed piecewise, as there is no point to closing it end-to-end. This is particularly true because most channels are closed by teardown of the calls to which they belong.

Finally, the channel protocol of a call specifies when the corresponding media channel is supposed to exist for the call. It is supposed to be available for use as soon as the oack signal is sent, which is when the channel is defined by DFC to be open. It is supposed to be unavailable for use as soon as the closeack signal is sent (or downack if there is no closeack), which is when the channel is defined by DFC to be closed. If opening and closing of real media channels is fast enough in comparison to human reaction times, then it may be acceptable to take the above requirement casually. For example, a box might issue the implementation command to create a channel before sending the corresponding oack signal, but not wait to ensure that the command has been obeyed. If the implementation is slow, on the other hand, then it is necessary to be more careful. No oack signal should be sent until there has been confirmation of the existence of the media channel for the call.

A summary of protocol signals used in a preferred embodiment of the present invention are set forth in FIG. 20. Columns after the type column indicate which argument fields a signal must have (denoted by "X") or may have (denoted by "?"). Argument fields are abbreviated as follows:

IO is the internalOrigin field, of type port.

T is the tunnel field, of type nonNegativeInteger.

R represents the routing fields.

M is the medium field, of type {voice, text, . . . }.

OSF represents other status fields, which may be appended to these signals.

3. Status Signals

Unlike the signals of the preceding two protocols, the set of status signals is inherently extensible. For this reason, we place more emphasis on sets of status signals than on specific signals. There are some built-in sets of status signals, and there are also opportunities to define new sets of status signals for specific purposes. It is also possible to extend any built-in status signal by adding additional fields to it. All of this information is summarized in the FIG. 21, where a complete table of DFC status signals can be found. Columns after the type column indicate which argument fields a signal must have (denoted by "X") or may have (denoted by "?"). Argument fields are abbreviated as follows:

IO is the internalOrigin field, of type port.

T is the tunnel field, of type nonNegativeInteger.

EO is the externalOrigin field, of type address.

CH is the char field, of type SAlphabet.

ST is the string field, of type SString.

OSF represents other status fields, which may be appended to these signals.

Response Signals. A customer's call is usually a request to communicate with another customer. The request is carried by the call and channel protocols. Since the call protocol works piecewise, however, the responses it provides are local—they come from the next feature box in the usage, rather than from another customer. Even though channels are opened end-to-end, the use of in-band signaling might cause a channel to be fully opened before another customer is reached. The primary purpose of response status signals is to provide end-to-end responses to communication requests. These signals are typically generated by interface boxes that have received communication requests, and they usually propagate back to the interface box that is the original source of the communication request. For these reasons, the set of response status signals is fixed and universal. They would be used even in a DFC system with no features whatsoever.

The response status signals related to a call are:

{ unknown,
avail,
unavail }

The signal unknown indicates an invalid target address; it replaces unobtainable in the original DFC. The signal avail indicates that the usage has successfully reached an interface box; it has no equivalent in original DFC. For this signal "success" is from the viewpoint of the interface box. Depending on how the box is programmed, it might not signal "success" unless it has definite information that the device behind the interface is working. The signal unavail indicates that the usage has failed to reach an interface box or has reached one unsuccessfully. It replaces busy in original DFC.

The response status signals related to a media channel are:

{ ready,
wait,
accept,
reject }

The signal ready indicates that the originating interface box has received an oack signal in response to the open signal it generated. In a typical customer call, it is generated by the calling line interface. Because a DFC internal call does not transmit an oack signal until its media channel exists, and also because a DFC feature box does not send an oack signal until it has received a corresponding one (this is part of the discipline of end-to-end channel opening), the ready signal guarantees that the media channel is fully available between its two endpoints. It has no counterpart in original DFC, in which signaling/media synchronization was not an immediate concern.

The remaining response status signals are sent by the callee line interface in a typical, simple customer call. The signal wait indicates that the generating interface box is attempting to enable communication on the requested medium. This might involve initializing a device, alerting a person to come to a device, or asking a person's permission to communicate on the channel. The signal wait replaces alerting in original DFC. The signal accept indicates that the device and customer are ready and willing for communication through the requested medium; it replaces answered in original DFC. The signal reject indicates that the device or customer is unwilling or unable to communicate through the requested medium. It does not correspond directly to any status signal in the original DFC, because in the POTS protocol used in original DFC, the only way for a customer to refuse communication is to fail to accept (answer) it.

Note that an accept signal is never sent without permission from some entity outside DFC, usually a customer or a customer surrogate such as an answering machine. In contrast, an avai1 signal can be sent on the authority of the interface box alone. Section 4 gives examples motivating such distinctions.

Response status signals can travel interface-to-interface without interference, but that is by no means the only possibility. Many feature boxes do their jobs by manipulating response signals: generating them, absorbing them, delaying their propagation to interject another action, etc.

No patterns, orderings, or other constraints can be imposed on the response status signals in a usage. Features manipulate them in such a variety of ways that every possible rule has a readily conceived, useful counterexample. This is not a problem for the DFC architecture, however, because nothing else in the infrastructure depends on them. For example, consider a calling line interface that has opened a voice channel and received both wait and accept status signals referring to it. We might think of asserting that no more response signals can arrive at this particular interface box on this particular channel. But the assertion would be wrong. If the caller has a Three-Way Calling (3WC) feature, he can use it to put one party on hold and call another. The call to the second party will also involve response status signals. Between the 3WC box and the second callee, they will be associated with a new voice channel. Between the 3WC box and the caller, on the other hand, they will be associated with the previously established voice channel.

Interface Signals. The primary purpose of interface status signals is to support the user interface between a customer and the features she is using. They represent commands, queries, responses, and reports. A telecommunication system can have many different user interfaces, and thus, many different sets of interface signals.

Interface signals can refer to a media channel of a call or to the call as a whole. The distinction is not particularly significant here. It should be noted, however, that when a user action stimulates an interface box to generate a DFC interface signal, the interface box must have an unambiguous rule for establishing which tunnel to send the signal through. Similarly, the way that an interface box indicates arrival of a DFC interface signal to its user (by playing a tone, flashing a light, displaying text, etc.) should be sensitive to the tunnel through which it arrived. Every DFC system needs a set of universal input signals. Their purpose is to give any feature box a vocabulary in which to accept queries and commands, even if it does not know the identity of the customer or the characteristics of his telecommunication device. Every first-class telecommunications device must be capable of generating all signals in this set.

Obviously it makes sense to think of this set of signals as an alphabet. Syntactically, an alphabetic interface signal has a signal type symbol and a field char: SAlphabet, where SAlphabet is the chosen signaling alphabet. SAlphabet is a distinct set from AAlphabet, the alphabet from which addresses are formed. In the PSTN there is a great deal of experience with a particular signaling alphabet, that of the DTMF tones and their associated symbols. This experience tells us to make the addressing alphabet (consisting of digits in the PSTN) a proper subset of the signaling alphabet (digits plus asterisk and octothorp in the PSTN). Then addresses can be spelled out as sequences of signals, which is extremely useful, and there are also some symbols left over to serve as delimiters. So the two alphabets of a DFC system should be chosen such that AAlphabet ⊂ SAlphabet.

All interface signals that are not alphabetic interface signals are custom interface signals. Typically each kind of interface box has its own set of custom interface signals. It contains the special signals it can generate to control features, and the special signals it can accept from features for display to the customer. For example, an ISDN telephone has buttons marked "conference," "transfer," "drop," and "hold." By pressing one of these buttons, a user can cause a DFC line interface to generate a custom interface signal corresponding to the button. The telephone will only work satisfactorily if its address subscribes to features that perform these functions in response to these signals, and the features will only work satisfactorily if they are subscribed to by addresses of line interfaces that can generate these signals. In original DFC there were a few status signals that have not yet been mentioned here: flash, dial tone, and quiet. These should be treated as custom interface signals for a particular type of telecommunication device. To see why, imagine using a sound-enabled PC as a telecommunication device; it is very unlikely that dialtone would be part of its user interface.

Environment-Originated Signals. An "environment-originated" signal is a DFC signal originally generated by a line interface, even if it is later propagated by feature boxes. If a type of status signal can be originated by the environment, then all signals of that type must carry with them an externalOrigin field of type address (as defined in co-pending utility application entitled "Routing Extensions for Telecommunication Network System and Method"). For example, the signal type avail can be, and usually is, generated by a line interface. When it is generated by a line interface, the externalOrigin field carries the relevant member of LAddress. When it is generated (as occasionally happens) by a feature box, then the feature box must supply the address of the target whose availability it is supposed to be indicating. Typically the feature box is subscribed to in the target zone by an address, and the box uses this address in the externalOrigin field of any avail signal it generates. The signal type unavail is generated specifically when the target address does not lead to an interface box. For diagnostic purposes, the bad address is returned in the externalOrigin field. All response status signals and all alphabetic interface status signals carry externalOrigin fields. Custom interface status signals carry these fields if and only if signals of their type are sometimes environment-originated. The status signals to be discussed in the next two subsections, however, are never environment-originated and do not carry externalOrigin fields.

Feature Signals. Roughly speaking, response signals pass information between interface boxes, and interface signals pass information between feature boxes and interface boxes. Feature status signals, not surprisingly, pass information only between feature boxes. In the best case, feature signals provide private communication between boxes of the same feature. The new status signals supporting a feature are introduced to the system at the same time that the feature is. In the worst case, feature signals provide explicit interaction between different features. This is unfortunate—although occasionally necessary—because it compromises feature modularity. When the second feature is added to the system, along with the new status signals, the first feature must be modified to process them appropriately.

Media Signals. Status signals in the final category, media signals, support media transmission. The use of a set of media signals to support transmission of a medium on a channel is determined by (associated with) the medium named in the open signal. The media signals, if any, travel through the media channel's signaling tunnel.

For one example, consider a DFC system with a medium text. If the quantity of text is known to be limited, text can actually be transmitted on the signaling channel. This has several advantages: it requires no separately implemented media channel, it ensures that text will be transmitted with complete reliability, and it eliminates any possibility of media/signaling synchronization problems. If the text medium in a particular DFC system is transmitted on the signaling channel, then that medium is associated with a type of media status signal text. Each text signal carries a string-valued field; the concatenation of these fields in a sequence of received text signals is the string of received text.

For another example, co-pending utility application "Routing and Signaling Optimizations for Telecommunication Network System and Method" presents a scheme for implementing the voice medium of a DFC system. The salient characteristic of this scheme is that it separates media transmission from signaling—the media path might be nowhere near the usage it is implementing. This scheme requires that an extra field be added to each open or oack signal referring to a voice media channel. The extra field indicates where the sending port is located in the implementation. Although these fields are attached to channel-protocol signals for timeliness, they are, in essence, status signals of the voice medium. Finally, separate implementation of signaling and media channels raises the possibility that media and signaling channels of the same call might become badly out-of-synchronization. It might be practical to alleviate this problem by inserting time markers in both media and signaling streams, which could then be matched up by media-processing endpoints. If such a scheme were to be adopted, then the time markers in the signaling stream would be media status signals.

4. Interface Behavior

Figure 3:
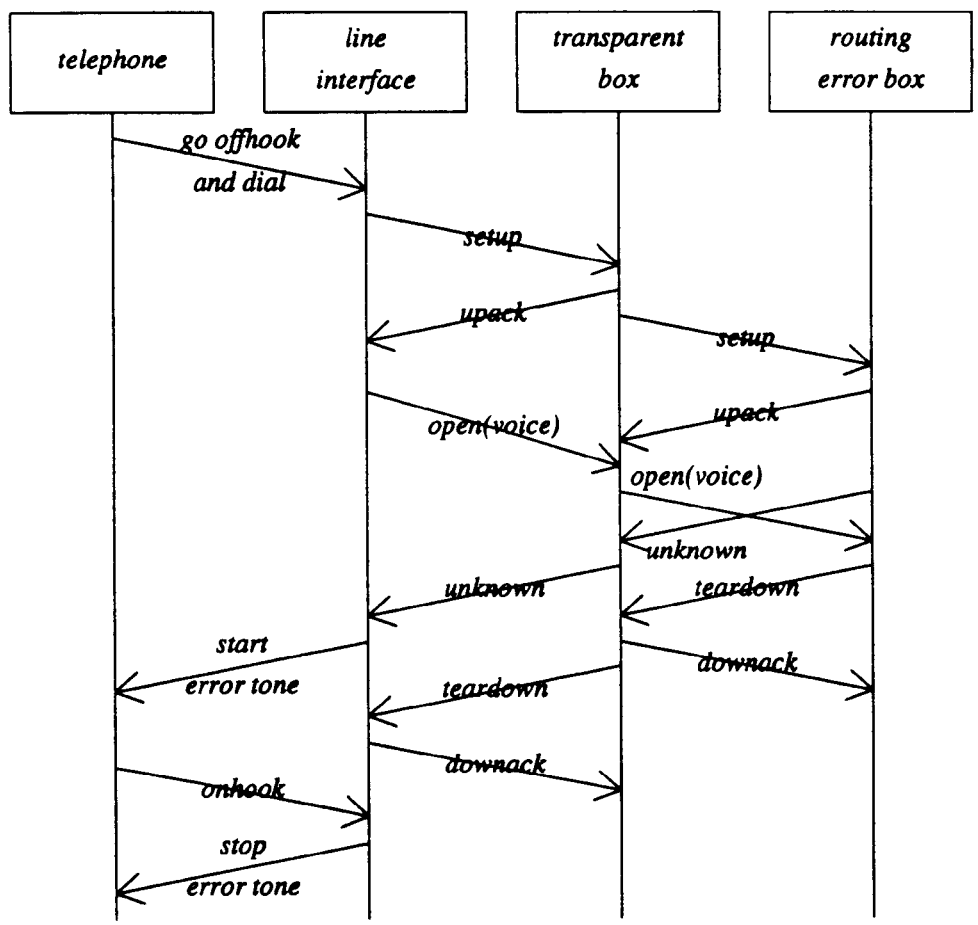
FIG. 3 is a message-sequence chart illustrating the failure of a customer call when the target address is invalid.

Line Interface Behavior. This section focuses on how line interfaces should use and react to these protocols. Our first example, however, concerns what happens when an interface box cannot even be found because the target address is not in use. In this case, illustrated in FIG. 3, the DFC routing algorithm routes to a routing error box. This is like a free feature box, see co-pending utility application entitled "Routing Extensions for Telecommunication Network System and Method", and is the usual source of unknown signals.

Figure 4:
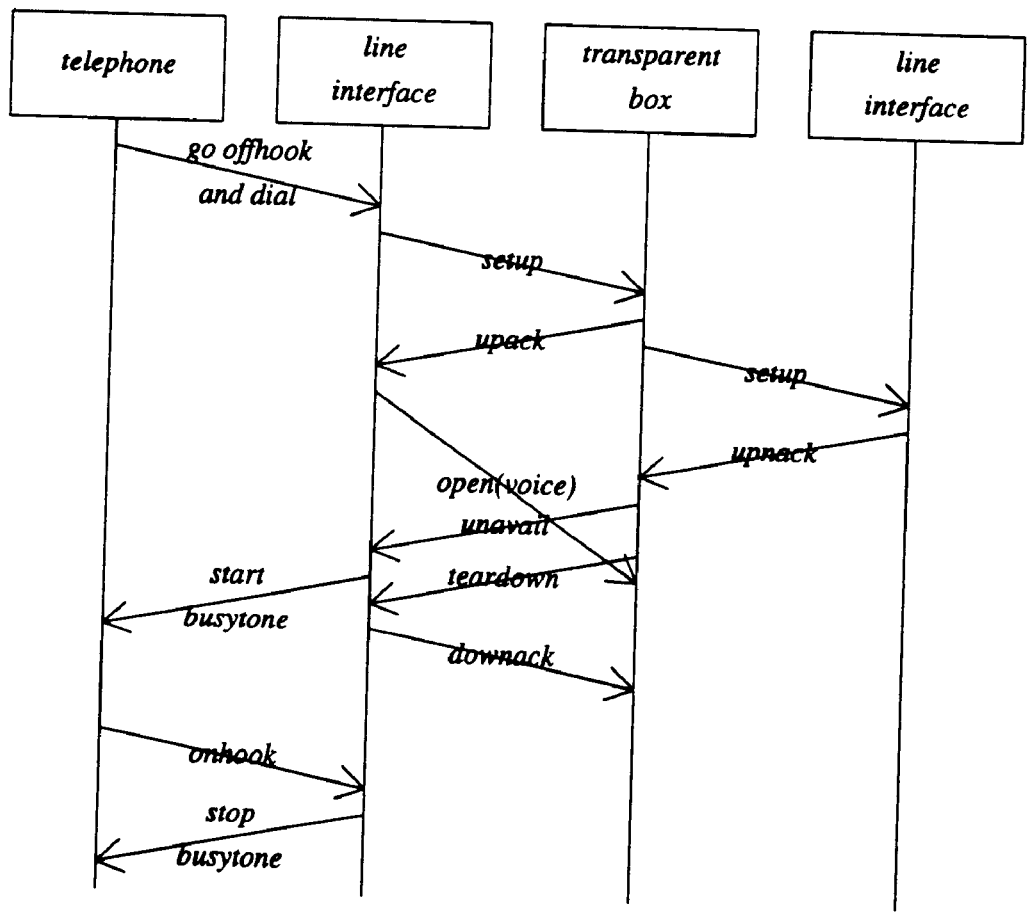
FIG. 4 is a message-sequence chart illustrating the failure of a customer call when the target line interface is not available.

FIG. 4 shows what happens when all ports on the target line interface are already occupied with other calls. A new setup attempt fails. The box that made the setup attempt cannot send the upnack signal upstream because it has already sent upack. Instead, it generates an unavail signal, which plays the role that the busy signal played in original DFC.

Figure 5:
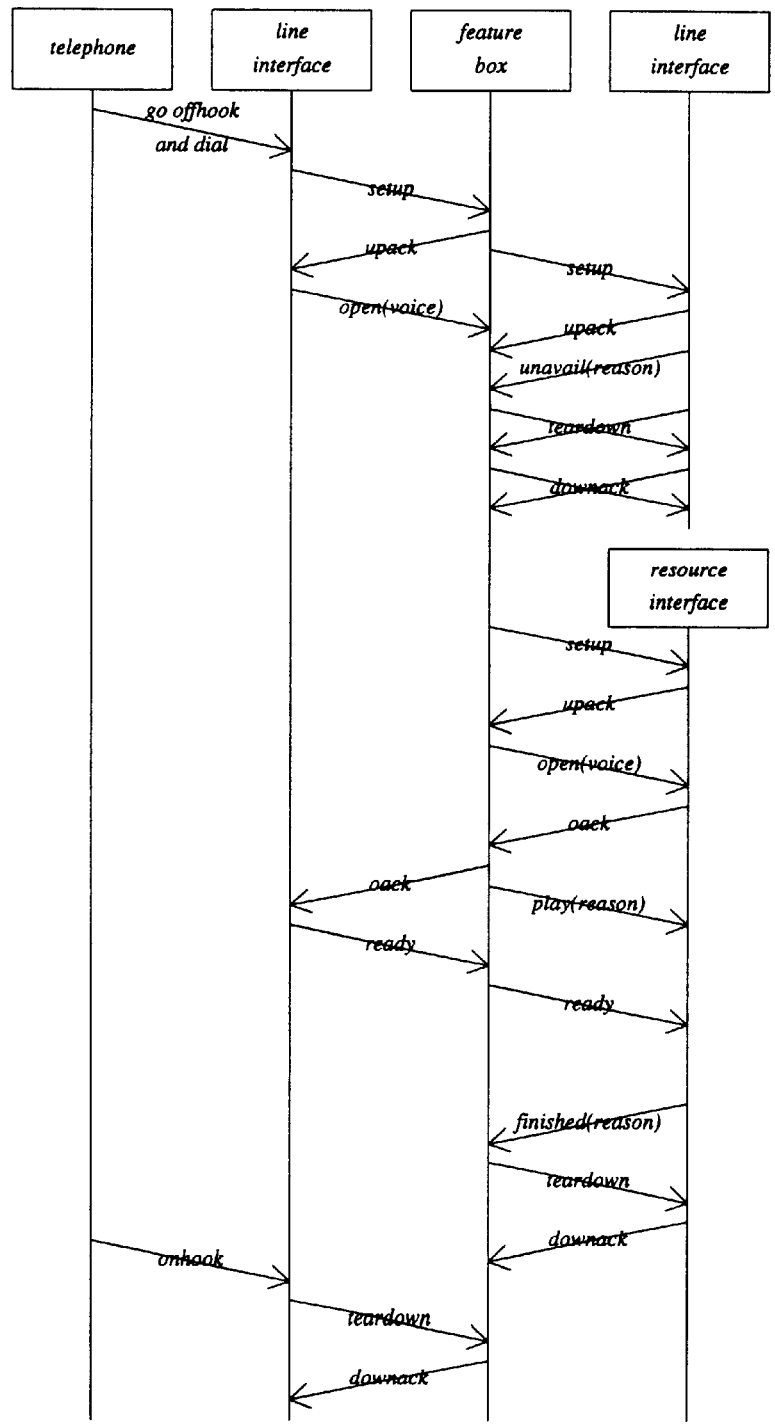
FIG. 5 is a message-sequence chart illustrating a target line interface providing additional information about the temporary unavailability of its device.

Another possibility is that a line interface might accept setup of a call, even though the line interface is aware that user communication cannot succeed because a line or device behind the interface is temporarily out-of-order. In this case, the line interface must generate an unavail signal, as shown in FIG. 5. An unavail signal generated by a line interface might be indistinguishable from an unaval signal generated by a feature box (as in FIG. 4). On the other hand, if the owner of the line interface so desires, it can contain additional information in the form of a field indicating the reason for the failure. Note that this is only useful if the same line interface's address subscribes to a feature box (also shown in FIG. 5) that can do something with the additional information. In FIG. 5, as soon as the reason is signaled, both the feature box and the line interface attempt to tear down the call between them, as both know that it is no longer any use. Then the feature box uses its idle port to call the interface of an announcement server (resource interface in FIG. 5). The voice channel is opened between the caller line interface and the resource interface, and as soon as the resource interface learns that the voice channel is ready, the announcement server plays a suitable recording at the feature box's request. The feature box tears down the call to the resource interface as soon as it is done with the announcement server, but waits for the caller to take the teardown initiative on its source side. Note that the augmented unavail signal has been absorbed by the feature box, so there is no question of what the caller line interface would do with it.

We have now discussed the two major circumstances under which an unavail signal would be sent. In all other cases a line interface accepting setup of a call should promptly generate an avail signal for the call.

Figure 6:
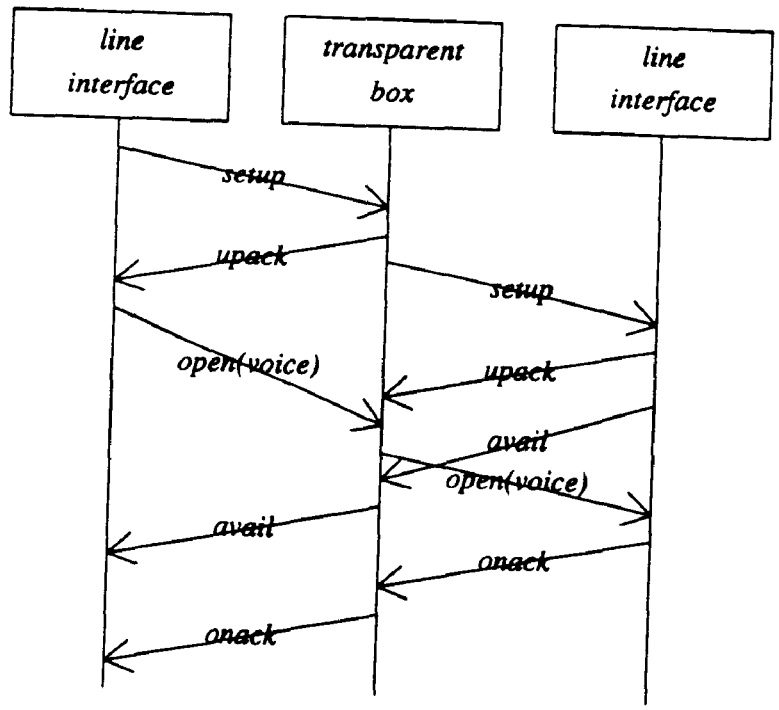
FIG. 6 is a message-sequence chart illustrating the failure of a customer call when the target device cannot handle the requested medium.

A line interface that has accepted a call may later receive an open signal requesting communication on a particular medium. This attempt to open a media channel might be rejected immediately because the device cannot handle the requested medium (FIG. 6). In this case the interface box simply returns an onack signal. The scenario in FIG. 6 cannot occur in POTS—POTS line interface would never indicate the success of an incoming call and then reject a voice open. Thus there is no standard for the behavior of the calling device and line interface in this scenario, and we have not shown any in FIG. 6.

Figure 7:
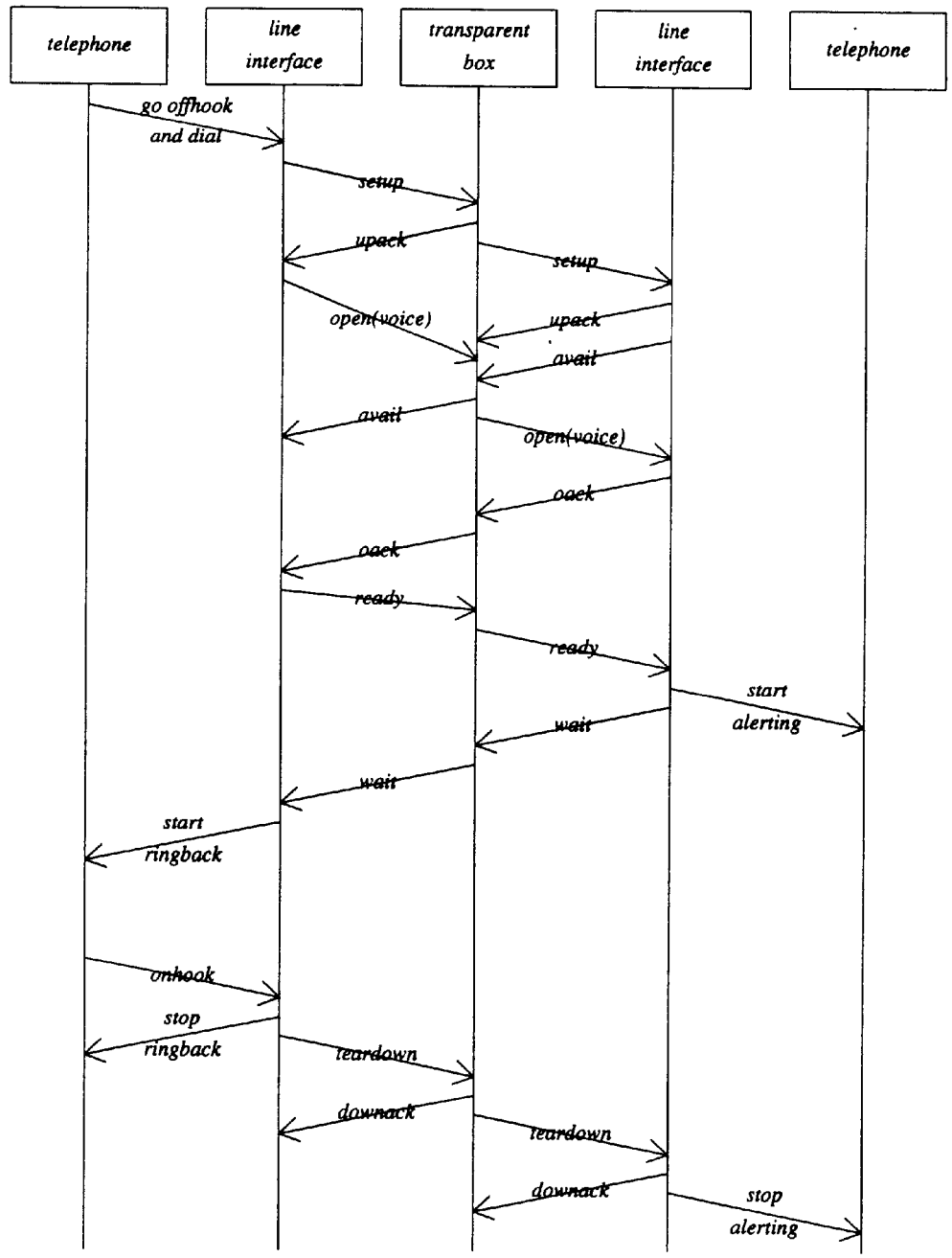
FIG. 7 is a message sequence chart illustrating the failure of a customer call when the target customer does not answer.

FIG. 7 shows a more familiar scenario: the target customer simply does not answer. In FIG. 7 both line interfaces provide a POTS experience to the users. Note that the callee is not alerted until the voice channel is known to be ready.

Figure 8:
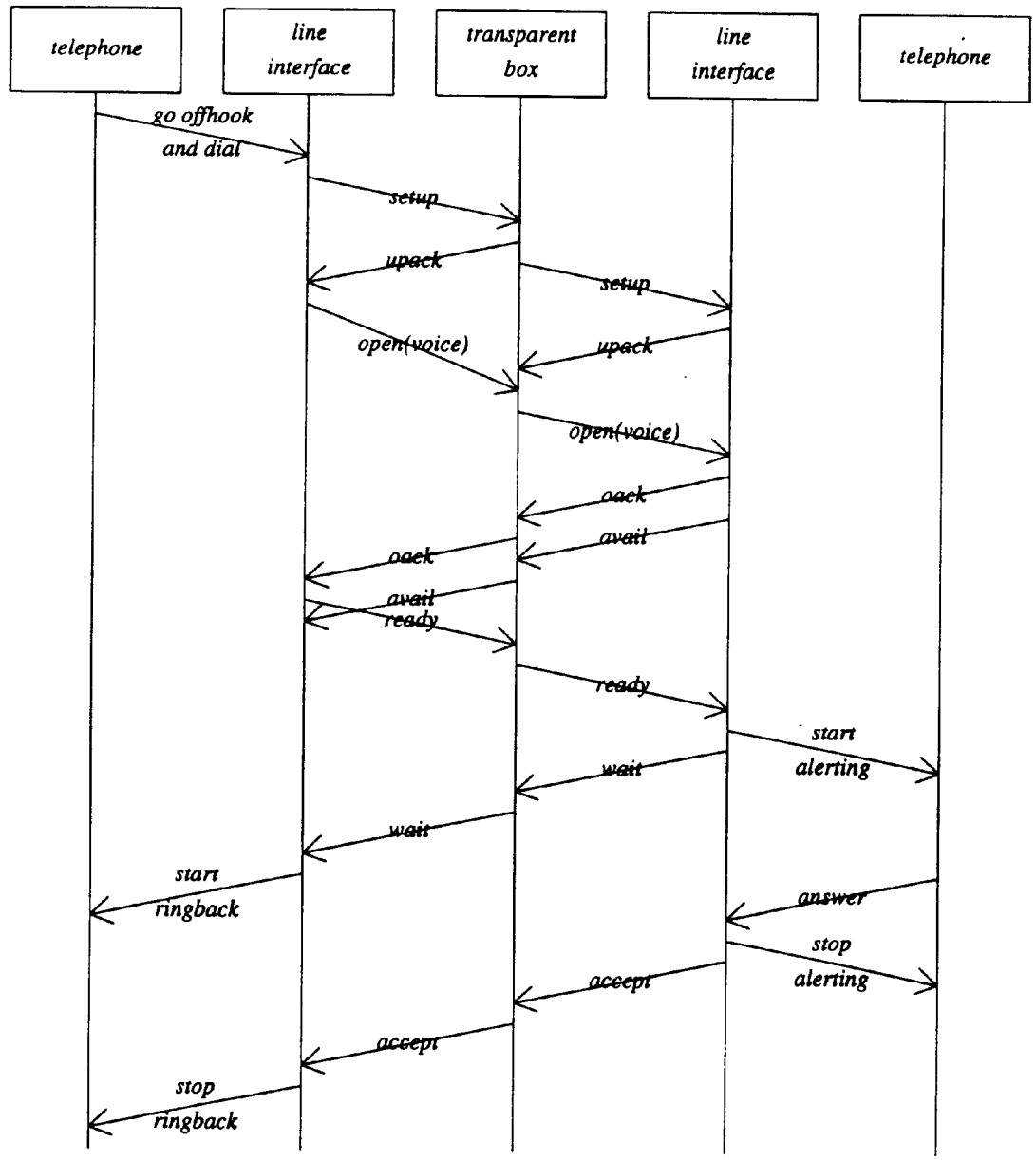
FIG. 8 is a message sequence chart illustrating the success of a customer call (the teardown signals are not shown).

FIG. 8 shows a successful customer voice call. In FIG. 8 the callee line interface does not send the avail signal until after the oack signal. This is just for variety, illustrating that the protocol does not impose an ordering constraint on them.

Figure 9:
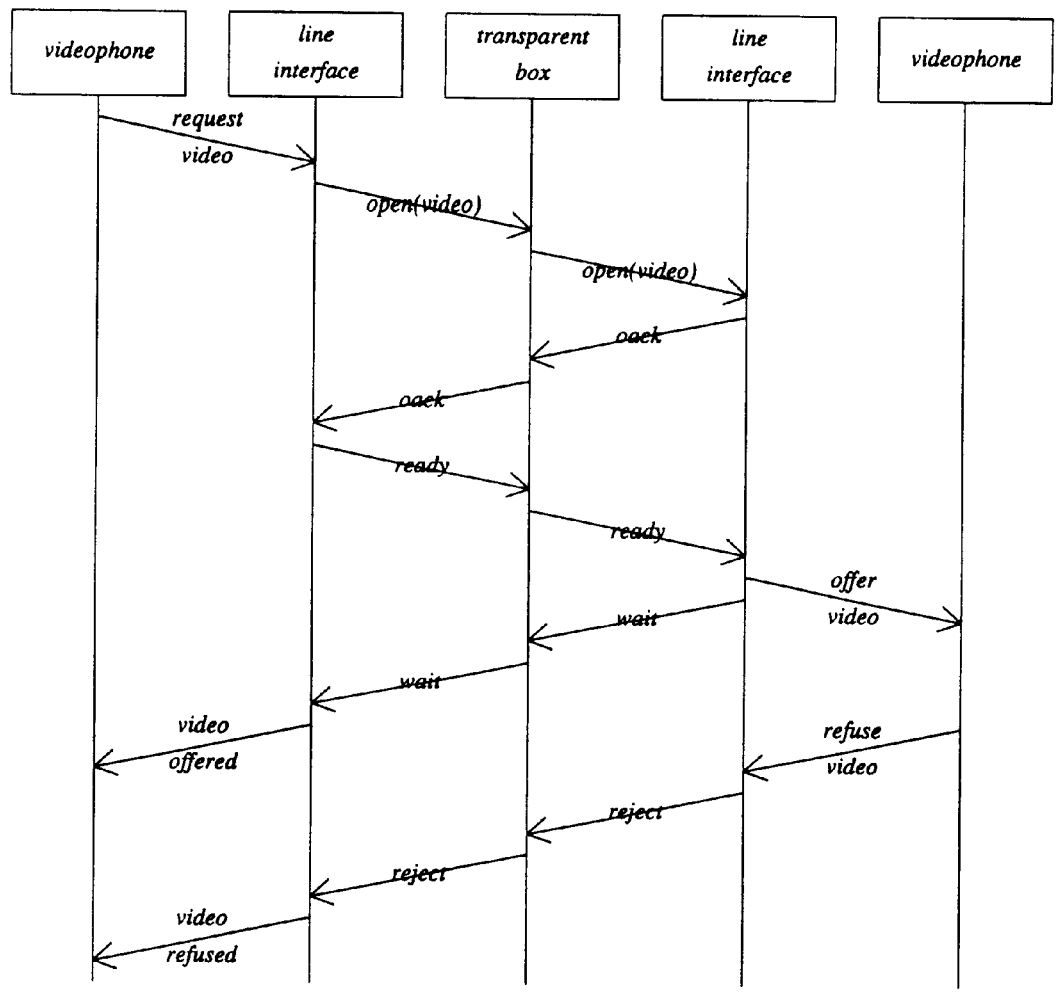
FIG. 9 is a message sequence chart illustrating a customer refusing to add video communication to a voice communication.

Finally, FIG. 9 starts where FIG. 8 leaves off. The devices are now videophones, and the caller wishes to add a video channel to the voice channel. The chain of oack signals from the target to the source indicates that the target device is able to communicate through the requested medium. It says nothing about the wishes of the customer, who may have dashed out of the shower to answer the alerting (a request to communicate by voice) wearing nothing but a towel. In FIG. 9 the ill-clad customer declines video communication, and this news propagates back to the caller in the form of a reject response status signal.

The user-level characteristics of each medium are different. This is why we have multimedia communication, and also why it is necessary to ask the user's permission for communication on each channel separately. In contrast, a line interface's acceptance of a call means nothing more than the existence of a signaling channel. These relationships are difficult to understand from POTS alone, because in POTS the call levels and channel levels are inextricably entwined.

Trunk Interface Behavior. In DFC a trunk interface acts as a proxy for line interfaces on other systems. Thus a trunk interface playing the role of a callee in a usage participates as above in the call and channel protocols. But it should not generate any response or interface status signals on its own initiative. Rather, it should only do so after receiving equivalent information from a remote line interface. In the same vein and for the same reason, the externalOrigin field of any status signal generated by a trunk interface should carry a value of type TAddress. This should be the address of the remote line interface that originated the signal.

Resource Interface Behavior. Resource interfaces are an implementation-oriented part of DFC, and not directly observable by customers. For this reason, it is advantageous that resource interfaces do not generate response status signals. As shown in FIG. 5, each resource interface has a set of interface status signals based on the resource device's programming interface. These provide a control/status language for communication between the resource and the feature box using it. They should never be forwarded by a feature box in the direction of a line or trunk interface.

5. Transparent Behavior

FIGS. 17A and 17B presents a Promela program for a free, two-port transparent box. The argument p1 is the address of the callee port, for receiving an incoming DFC call. The argument p2 is the address of the caller port, for placing an outgoing DFC call. The argument b is the address of the box, for receiving a setup signal on behalf of the callee port. The program accommodates only one media channel in each call, which is identified as channel 5 (some consequences of this will be discussed later). It is important to note the difference between this program and the previous ones described above. The previous programs were nondeterministic, intended to include all possible port behaviors used for all possible purposes. This is a deterministic program written for a particular purpose. There might be different programs that would achieve the same purpose, and there are certainly many other purposes for which a free, two-port box program might be written.

The use of unavail on line 7 is a bit of cheating. For the rest of this program signals of type unavail are included in the generic type status, but on this particular line we wanted to emphasize exactly what was going on.

State names are the key to understanding this program. In the state requesting, the box is waiting to find out the outcome of its attempt to make an outgoing call. In the state callsonly, calls are set up at both ports, but the media channels of both are idle. In the state p1opening, calls are set up at both ports, and the callee port p1 has received a request to open the media channel. The box has forwarded it downstream through the caller port p2, and is now waiting for a response. The state p2opening is similar to p1opening, the only difference being that the channel request came from p2. In the state opened, media channel 5 is opened in both calls.

In the state closingp1, calls are still set up at both ports. One media channel has been closed through port p2, and the other is being closed through port p1. The state closingp2 is similar.

In the two states cleaningp1 and cleaningp2, it does not matter what states the media channels are in, because the calls are being torn down. In cleaningp1 the call at p2 is already gone. In cleaningp2 the call at p1 is already gone.

Unfortunately this program has only one level of state, which requires a large number of transitions. Each of the states in which both calls are set up, except for callsonly, has an ellipsis here. It stands for the last four transition rules in callsonly, lines 15–21, which should be repeated in the marked places.

Figure 18:
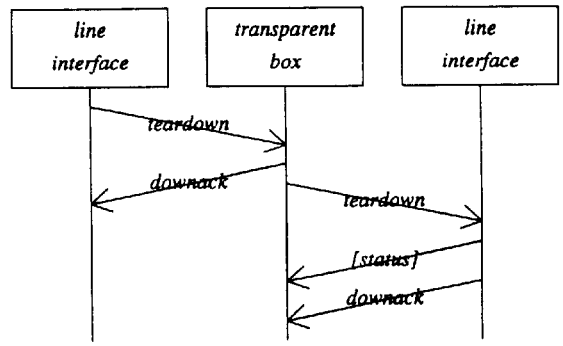
FIG. 18 is a message sequence chart illustrating piecewise call teardown in a usage.

FIG. 18 illustrates an interesting aspect of teardown behavior in a usage. Consider the state of the rightmost line interface just after it has received the teardown signal. Is it acceptable for this box to send a status signal before sending the required downack signal? There are no arguments against the late status signal in Sections 1 and 2. In fact, from the perspective of the transparent box receiving a status signal after sending a teardown signal, it is unobservable whether the status signal was sent before or after the teardown was received. Only by taking the larger view illustrated by FIG. 18 can we see the futility of the late status signal. It is absorbed by the transparent box, which has nothing else to do with it because the call at its other port is already gone. It is extremely unlikely that a status signal emitted late from a box would ever reach another box that could do something useful with it. In fact, there should be no need for box programs to send late status signals. Once the usage is being torn down, there is nothing else that a feature box can do to interact with or directly serve a customer. It is true that there might be a need to clean up ongoing transactions with operational data and system resources. Each feature box must be able to do these things autonomously, however. To have one feature box depending on another for this sort of work is a serious breach of modularity.

Figure 19A:
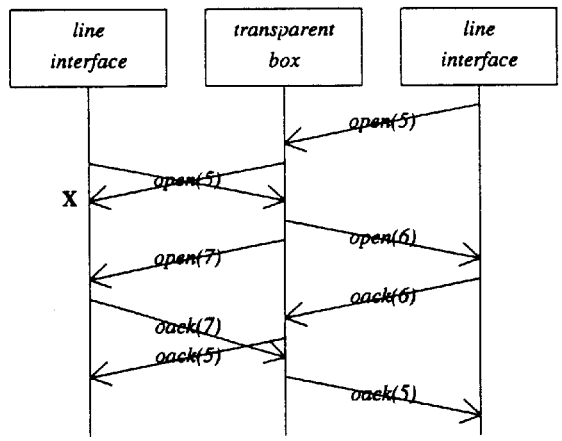
FIG. 19A is a message sequence chart illustrating treatment of channel glare.
Figure 19B:
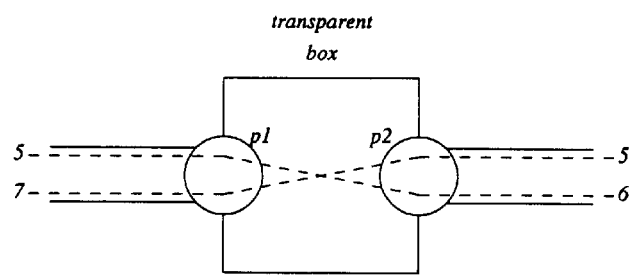
FIG. 19B is an abstract diagram illustrating treatment of channel glare at a transparent box.

The most complicated aspect of this program its treatment of glare, which is illustrated in FIGS. 19A and 19B. We begin with the scenario illustrated by the message sequence chart in FIG. 19A. This is the only scenario in which the transparent box is involved in glare and is responsible for doing something about it. In FIGS. 19A and 19B, both line interfaces are attempting to open media channel 5. Glare is detected by the transparent box when the open (5) signal it sent from port p1 receives an open (5) signal in response. Since the transparent box is playing the callee role at port p1, it knows that it is the loser of the glare contest. It also knows that the open (5) signal it sent from port p1 has been ignored (see the X in FIG. 19A). The detection of glare is shown on line 36 of the program, although the glare treatment is not shown. As ar as the transparent box is concerned, the channel requests from both line interfaces are ndependent (they may, for example, be requesting different media) and should both succeed. Channel identifiers are local to DFC calls, so the action taken by the box is to continue the clashing requests in each direction using different channel identifiers. The request from the rightmost line interface is propagated to the left on channel 7. The request from the leftmost line interface is propagated to the right on channel 6. If both requests are ultimately successful, then, as shown in FIG. 19B, the media channel known as 5 on the left of the box continues as 6 on the right of the box. Also, the media channel known as 5 on the right of the box continues as 7 on the left of the box.

In fact, glare can be prevented completely by conventions on the user of channel identifiers. For example, if the port at the caller end only attempts to open odd-numbered channels, and the port at the callee end only attempts to open even-numbered channels, then glare is impossible. We have discussed glare in such depth not because it is a serious problem, but because it illustrates so well the fact that channel identifiers are local to calls. No DFC programmer should assume that an end-to-end media channel has the same identifier in all its call segments.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented in the context of DFC; however, the principles of the present invention could be extended to distributed feature architectures. Such an extension could be readily implemented by one of ordinary skill in the art given the above disclosure.

What is claimed is:

1. A telecommunication network system comprising:
   a plurality of feature modules;
   a plurality of interface modules;
   communication channels connecting the modules further comprising one or more media channels that can be established between the modules;
   means for dynamically assembling the feature modules in a graph that connects interface modules that are participating in a communication usage and wherein one or more media channels can be established between modules in the graph and connected within each feature module so that one or more media paths can be established along a path that follows the graph between interface modules.

2. The telecommunication network system of claim 1 wherein the media channels may be opened and closed freely.

3. The telecommunication network system of claim 1 wherein the protocol used to open a media channel is nested inside and separate from the protocol used to connect the feature modules in the graph.

4. The telecommunication network system of claim 1 wherein the graph connecting the interface modules is constructed piecewise while the media paths are constructed end-to-end.

5. The telecommunication network system of claim 1 wherein a customer can choose the media channels utilized in the communication usage.

6. The telecommunication network system of claim 5 wherein the customer can be presented with a plurality of requests for each media channel separately and can respond separately to the requests.

7. The telecommunication network system of claim 1 wherein status signals are exchanged between modules reflecting status of a party to the communication usage.

8. The telecommunication network system of claim 7 wherein there is no constraint on the order or number of status signals.

9. The telecommunication network system of claim 8 wherein a party to the communication usage can cause the issuance of a status signal declining to open a media channel in addition to a status signal indicating a failure to respond to the request to open the media channel.

* * * * *